United States Patent
Tsekhovoi et al.

[11] 3,822,986
[45] July 9, 1974

[54] GAS DISTRIBUTION GRID

[76] Inventors: Avgust Rafaelevich Brun Tsekhovoi, ulitsa Garibaldi 21, korpus 3, kv. 32; Anatoly Naumovich Evreinov, pereulok Malo-Afanasevsky, 1/33, kv. 8, both of Moscow; Vladimir Fedorovich Stadnik, ulitsa Dobrokhotova, 7, kv. 92; Bosis Kuzmich Ilenko, ulitsa M. Krivonosa, 10, kv. 7, both of Kiev, all of U.S.S.R.

[22] Filed: June 7, 1973

[21] Appl. No.: 367,877

[52] U.S. Cl............. 431/328, 432/58, 432/215, 431/170
[51] Int. Cl............................................. F23d 13/12
[58] Field of Search............ 432/15, 58, 215; 431/7, 431/170, 328

[56] References Cited
UNITED STATES PATENTS
2,362,972  11/1944  Brownback .................. 431/170
3,417,978  12/1968  Suzukawa et al. ............ 431/7
3,759,660  9/1973   Bon et al. .................... 432/58

*Primary Examiner*—Carroll B. Dority, Jr.
*Attorney, Agent, or Firm*—Eric H. Waters

[57] ABSTRACT

A gas distribution grid for supplying a mixture of gas fuel and gaseous oxidizer into a bed of granular material disposed thereon without inflammation of said mixture prior to its getting into the bed, which grid comprises three partitions confining two chambers. The first chamber abutting the partition on which the granular material bed is disposed is used for supplying one of the components and is communicated with the other chamber into which the other component is supplied. The other chamber is communicated with the granular material bed by means of pipe branches.

2 Claims, 3 Drawing Figures

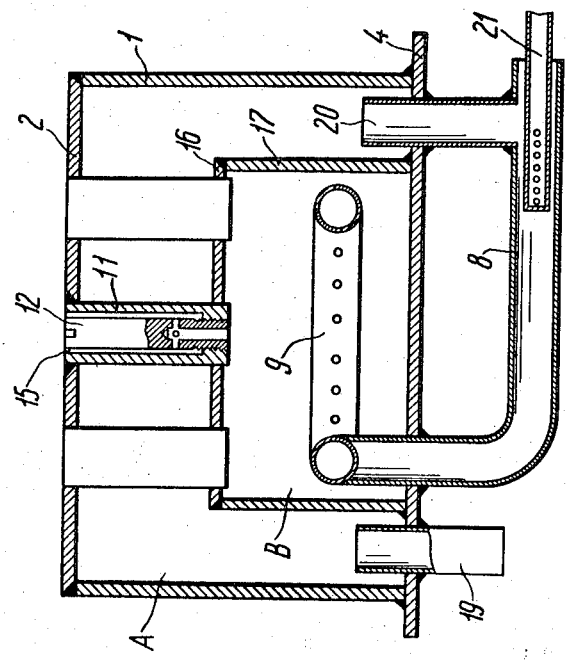
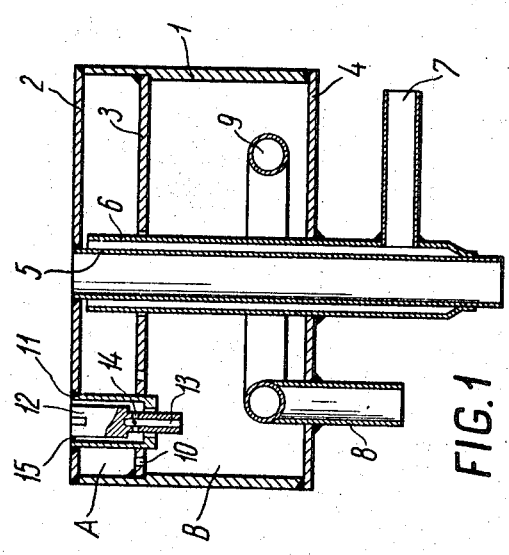
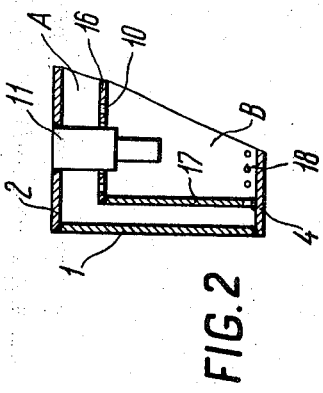
FIG. 1
FIG. 2
FIG. 3

GAS DISTRIBUTION GRID

The present invention relates to devices used for effecting the processes of mass-exchange between gaseous and solid granular materials in the cases when the starting gaseous mixture comprises a combustible component and an oxidizer, and, more particularly, to gas distribution grids.

The gas distribution grid according to the present invention can be most successfully used for combusting gas within the boiling layer of a solid granular material and in the case of carrying out diverse reactions of oxidation and oxichlorination.

Gas distribution grids used for effecting processes of mass-exchange in the fluidized bed of a solid granular material and comprising partitions arranged transversely relative to the direction of the flow of gases passed through the apparatus and pipe branches mounted therein and used for supplying gas are known (cf. U.S. Pat. No. 2,934,411).

A mixture of gas fuel and gaseous oxidizer is supplied into the space under the gas distribution grids on which a bed of the solid granular material is disposed. With combustible gaseous mixture disposed under the gas distribution grid, the latter may get inflamed and the whole apparatus may get damaged.

There are also known such gas distribution grids (cf. U.S. Pat. No. 3,215,508) in which, in order to preclude inflammation of the combustible mixture in the space under the grid, gas fuel and gaseous oxidizer are supplied separately along individual pipe branches into the bed of the solid granular material, whereupon said components are mixed within the bed of the solid granular material.

In this case, however, the components are mixed in the bed of the granular material non-uniformly, which brings down the effectiveness of the subsequent contact of the phases.

There is also known a gas distribution grid (cf. U.S. Pat. No. 3,617,294) that is free of the above-mentioned disadvantages. This grate comprises a housing and three partitions disposed transversely relative to the direction of the gaseous mixture flow and confining two closed chambers, one of the chambers being supplied with the gas fuel and the other one — with the gaseous oxidizer. The grid is provided with pipe branches passed through the partition on which the bed of the granular material is disposed and the central partition, with the aid of a system of orifices the pipe branches simultaneously communicating with each of said chambers. Disposed inside the pipe branches are inserts that form alongside with the walls of the pipe branches passages in which the gas fuel and gaseous oxidizer are mixed. The cross-sectional areas of said passages are selected so that the rate at which the mixture flows into the bed of the granular material exceeds the rate at which the flame spreads in the mixture. Owing to this fact it becomes possible to mix the components in the above-mentioned grid and, at the same time, to preclude the possibility of the mixture inflammation before it gets into the bed.

This grid is disadvantageous in that, due to unavoidable inaccuracies in manufacture of the pipe branches and inserts, the components are distributed between the pipe branches non-uniformly, this, in its turn, resulting in that the composition of the mixture supplied into the bed of the granular material is different at various points of the bed, and, consequently, the temperature in the bed of the granular material may be non-uniform.

It is an object of the present invention to provide such a gas distribution grid that would ensure a uniform composition of the mixture of gas fuel and gaseous oxidizer at the point where it leaves all the pipe branches of the grid and enters the bed of the granular material, and would preclude, at the same time, inflammation of the gaseous mixture before it gets into the bed of the granular material.

This aim is achieved by that in a gas distribution grid used for supplying a mixture of gad fuel and gaseous oxidizer into a bed of solid granular material without inflammation of said mixture before it gets into the bed, and comprising a housing which is provided with three partitions disposed transversely relative to the direction of the mixture flow and confining two chambers, the outer side of one of the external partitions being adapted for the bed of the granular material to be disposed thereon, according to the present invention, the chamber abutting the partition on which the layer is disposed is provided with a means used for supplying therein one of the components and is communicated with the other chamber provided with a means used for supplying therein the other component of the mixture, and, consequently, accommodates the mixture and is communicated with the bed of the granular material by means of pipe branches passed through the central partition and the partition on which the bed of the material is disposed and used for supplying the mixture from the second chamber into the bed.

In a gas distribution grid provided with a pipe used for outlet of the granular material from the bed and passed through all the three partitions, the means used for supplying one of the components into the chamber abutting the partition on which the bed of the material is disposed, may be fashioned as a pipe branch that from outside embraces said pipe with a gap communicated with said chamber and the pipe branch used for supplying the component.

The gas distribution grid of the present invention is advantageous in that the composition of the mixture of gas fuel and gaseous oxidizer, delivered from all the pipe branches into the bed of the solid granular material is uniform, which provides for a more effective utilization of the bed volume and eliminates such undesirable effects as local over-heating of the bed. At the same time, the chamber accommodating the mixture of gas fuel and gaseous oxidizer is completely isolated from the hot walls of the grid, contacting the incandescent granular material, which precludes inflammation of the mixture in the chamber.

The following description of exemplary embodiments of the present invention is given reference to the accompanying drawings, in which:

FIG. 1 shows schematically a cross-section of the gas-distribution grid according to the present invention, one pipe branch being shown conventionally;

FIG. 2 shows a cross-section of a part of the gas distribution grid according to another embodiment of the present invention;

FIG. 3 shows a cross-section of the gas distribution grate according to a third embodiment of the present invention.

The gas distribution grid used for supplying a mixture of gas fuel and gaseous oxidizer into a bed of solid granular material, disposed thereon, without inflammation of said mixture before it gets into the bed, comprises a housing 1 (FIG. 1) having partitions 2, 3 and 4. The partitions 2 and 3 confine a chamber A, while the partitions 3 and 4 confine a chamber B.

The outer side of the partition 2 is used for the bed of the solid granular material to be disposed thereon. The chamber A is provided with a means used for supplying therein one of the components and fashioned, for example, as a pipe branch or a distributing manifold (not shown in the drawing). In a gas distribution grid provided with a pipe used for discharging the granular material from the bed, like, for instance, in the case of the grid having a pipe 5, which is shown in FIG. 1, it is expedient to employ a pipe branch 6 embracing the pipe 5 with a gap communicated with the chamber A and a pipe branch 7 for supplying the components into the chamber A. The chamber B is provided with a means used for supplying therein the other component, said means being fashioned, for example, as a pipe branch 8 communicated with a distributing manifold 9. The chamber B is communicated with the chamber A through the intermediary of orifices 10 made in the partition 3, as a result of which the chamber B accommodates the mixture of the components of which one is supplied into the chamber B from the distributing manifold 9 and the other one is delivered from the orifices 10. The combustible mixture to be found in the chamber B is insulated from the hot pipe 5 along which the granular material is discharged from the bed in the course of operation of the gas distribution grid in the apparatus by using circulation of the granular material with the aid of the pipe branch 6, and is insulated from the hot partition 2 on which the bed of the incandescent granular material is disposed by means of the chamber A, which precludes inflammation of the combustible gaseous mixture in the chamber B. The chamber B is communicated with the bed of the granular material disposed on the partition 2 by means of pipe branches 11. It is expedient to mount inserts 12 in the pipe branches 11, said pipe branches 11 having axial orifices 13 and radial orifices 14, which makes it easier to provide passages 15 communicating the chamber B with the bed of the granular material of such a cross-sectional area that would ensure a higher rate at which the gas mixture flows therefrom than the rate of the flame spreading in the mixture, owing to this the flame is prevented from getting along the pipe branches 11 into the chamber B.

In cases when the side walls of the housing 1 may get heated, for example, in the case of use of the gas distribution grid in an apparatus whose inner diameter is greater than the outer diameter of the housing 1, it is advantageous to make the central partition separating the chamber A from the chamber B the way the partition 16 shown in FIG. 2 is made.

In this case the partition 16 rests on a cylindrical ring 17 which makes it possible to insulate the chamber B from the hot walls of the housing 1. Provided in the bottom portion of the cylindrical ring 17 are additional orifices 18 used to communicate the chamber B with the chamber A, which allows to cool the side walls of the housing 1 of the gas distribution grid.

When the components of the mixture to be combusted differ considerably by their density (molecular weight), it is expedient to mix the components with the aid of special mixers that provide for the optimum conditions of the gas mixing, accounting for the physical properties of the components. A gas distribution grid in which the components are mixed with the aid of such a mixer is shown in FIG. 3. One of the components of the mixture is supplied into the chamber A of the gas distributing grid along a pipe branch 19, and the chamber A is communicated with the chamber B through a pipe branch 20 connected to a mixer 21 of any conventional design, that is built in, for example, the pipe branch 8 used for supplying the second component. As a result of this, a ready mixture is delivered through the distributing manifold 9 into the chamber B.

The gas distribution grid of the present invention functions as follows.

One of the components, for instance, the gas fuel is supplied into the chamber A through the pipe branch 7 and the pipe branch 6 (FIG. 1), and through the orifices 10 provided in the partition 3 is further delivered into the chamber B into which the other component, i.e. the gaseous oxidizer, is supplied through the pipe branch 8, this resulting in formation of a mixture of the components. Through the orifices 13 and 14 the mixture is delivered into the passage 15, and further, into the bed of the solid granular material to be found on the partition 2.

In the case of use of gas distribution grids with mixers (FIG. 3) one of the components, for example, the gas fuel, is supplied into the chamber A along the pipe branch 19, whereafter it is delivered along the pipe branch 20 into the mixer 21 to which the gaseous oxidizer is also supplied along the pipe branch 8.

Through the distributing manifold 9 the mixture is delivered into the chamber B and, further through the passages 15 into the bed of the solid granular material to be found on the partition 2.

The chamber B containing the mixture provides for supply into the bed of the solid granular material through all the pipe branches 11 of a mixture that is uniform from the viewpoint of its composition. At the same time, the design of a gas distribution grid according to the present invention provides for insulation of the chamber B from all the hot parts of the grate, which precludes inflammation of the mixture in the chamber B.

We claim:

1. A gas distribution grid for supplying a mixture of gas fuel and gaseous oxidizer into a bed of solid granular material disposed thereon without inflammation of the mixture before it gets into the bed, comprising a housing; three partitions disposed in said housing transversely relative to the direction of the mixture flow, and confining two chambers, the outer side of one of said external partitions being adapted to accommodate thereon a bed of granular material; a means used for supplying one of the components of the mixture into the first chamber abutting the partition on which the bed is disposed; a means used for supplying the other component into the other chamber communicated with the first chamber so that a mixture of the components is to be found in the former; pipe branches passed through the central partition and the partition on which the bed is disposed and used to communicate said other chamber with the bed of the granular material for supplying therein the mixture.

2. A gas distribution grid as claimed in claim 1, comprising a pipe used for outlet of the granular material from the bed and passed through all the three partitions; a pipe branch of said means used for supplying one of the components into the first chamber and embracing from outside said pipe with a gap communicated with said first chamber; a pipe branch used for supplying the component into the first chamber communicated with said gap.

* * * * *